United States Patent
Masumoto (10) Patent No.: US 10,867,764 B2
(45) Date of Patent: Dec. 15, 2020

(54) ACTUATOR

(71) Applicant: DAICEL CORPORATION, Osaka (JP)

(72) Inventor: Takaya Masumoto, Hyogo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 16/282,992

(22) Filed: Feb. 22, 2019

(65) Prior Publication Data

US 2019/0189374 A1 Jun. 20, 2019

Related U.S. Application Data

(63) Continuation of application No. PCT/JP2017/029982, filed on Aug. 22, 2017.

(30) Foreign Application Priority Data

Aug. 23, 2016 (JP) .................. 2016-162871

(51) Int. Cl.
*H01H 39/00* (2006.01)
*B60L 3/04* (2006.01)

(52) U.S. Cl.
CPC .............. *H01H 39/00* (2013.01); *B60L 3/04* (2013.01); *H01H 39/006* (2013.01); *H01H 2039/008* (2013.01)

(58) Field of Classification Search
CPC ................. H01H 39/00; H01H 39/006; H01H 2039/008; B60L 3/04

(Continued)

(56) References Cited

U.S. PATENT DOCUMENTS 2,305,436 A * 12/1942 McMorris .............. H01H 85/44
337/30
3,334,204 A 8/1967 Brenny et al.
(Continued)

FOREIGN PATENT DOCUMENTS

FR 2 736 973 A1 1/1997
JP 2004-532049 A 10/2004
(Continued)

OTHER PUBLICATIONS

International Search Report and Written Opinion dated Nov. 14, 2017 in related International Application No. PCT/JP2017/029982. (English translation of Int'l. Search Rep.).
(Continued)

*Primary Examiner* — Anatoly Vortman
(74) *Attorney, Agent, or Firm* — Knobbe Martens Olson & Bear LLP (57) ABSTRACT

An actuator includes an actuator body, an output piston portion, an ignition device and a sealing member formed of a metal plate-like member. The sealing member separates a space in the actuator body into a first space where the ignition device is disposed and a second space where the output piston portion is disposed, and seals a combustion product generated by the ignition device in the first space. A peripheral edge portion of the sealing member is fixed to an inner wall that defines the space. The sealing member is deformed by the gunpowder combustion such that its central portion is displaced to a side of the output piston portion, to thereby press the output piston portion using the central portion and cause the output piston portion to slide in the through hole. With this, energy for driving an output piston portion is suitably transmitted to the output piston portion.

12 Claims, 3 Drawing Sheets

(58) Field of Classification Search
USPC .......................................................... 337/401
See application file for complete search history.

(56) References Cited

U.S. PATENT DOCUMENTS

| | | | |
|---|---|---|---|
| 3,802,430 A | 4/1974 | Schwebel et al. | |
| 3,803,374 A | 4/1974 | Delgendre et al. | |
| 4,111,221 A | 9/1978 | Olsen | |
| 4,619,284 A * | 10/1986 | Delarue ................. | F15B 15/10 137/67 |
| 5,113,108 A | 5/1992 | Yamashita et al. | |
| 6,397,595 B2 | 6/2002 | Benoit et al. | |
| 6,556,119 B1 | 4/2003 | Lell | |
| 7,239,225 B2 * | 7/2007 | Tirmizi ................ | H01H 39/006 337/157 |
| 8,133,494 B2 | 3/2012 | zur Megede et al. | |
| 9,153,402 B2 * | 10/2015 | Ukon ................... | H01H 39/006 |
| 10,068,732 B2 * | 9/2018 | Gaudinat ............. | H01H 39/006 |
| 10,332,707 B2 | 6/2019 | Yamamoto et al. | |
| 2004/0015125 A1 | 1/2004 | Alexandre et al. | |
| 2004/0112239 A1 | 6/2004 | Parks et al. | |
| 2005/0034595 A1 | 2/2005 | Kordel et al. | |
| 2006/0027120 A1 | 2/2006 | Smith | |
| 2006/0281175 A1 | 12/2006 | McSwiggen et al. | |
| 2008/0132450 A1 | 6/2008 | Lee et al. | |
| 2010/0040619 A1 | 2/2010 | Li et al. | |
| 2013/0056344 A1 | 3/2013 | Borg | |
| 2014/0061161 A1 | 3/2014 | Nakamura et al. | |
| 2017/0229267 A1 * | 8/2017 | Lell ........................ | H01H 39/00 |
| 2017/0314582 A1 * | 11/2017 | Lell ..................... | A61M 5/2046 |
| 2017/0343021 A1 * | 11/2017 | Yamada ................ | F42B 3/006 |
| 2019/0001062 A1 | 1/2019 | Yamamoto et al. | |

FOREIGN PATENT DOCUMENTS

| | | | | |
|---|---|---|---|---|
| JP | 2005-523679 A | | 8/2005 | |
| JP | 2007-525192 A | | 9/2007 | |
| JP | 2008-508881 A | | 3/2008 | |
| JP | 2008-206477 A | | 9/2008 | |
| JP | 2010-503616 A | | 2/2010 | |
| JP | 2013-522834 A | | 6/2013 | |
| JP | 2016151318 A | * | 8/2016 | ............. F42B 3/006 |
| JP | 2014-049300 A | | 3/2018 | |
| WO | WO 2016/062304 A1 | | 4/2016 | |

OTHER PUBLICATIONS

Office Action dated Mar. 9, 2018 in related U.S. Appl. No. 15/638,170, in 32 pages.
Office Action dated Mar. 14, 2019 in related U.S. Appl. No. 15/638,211, in 10 pages.
Extended European Search Report dated Feb. 7, 2020 in European Application No. 17843595.4, in 8 pages.

* cited by examiner

ACTUATOR

CROSS-REFERENCE TO RELATED APPLICATIONS

This application is a continuation application, and claims benefit under 35 U.S.C. §§ 120 and 365 of PCT Application No. PCT/JP2017/029982, filed Aug. 22, 2017, which is hereby incorporated by reference. PCT/JP2017/029982 also claimed priority to Japanese Patent Application No. 2016-162871, filed Aug. 23, 2016, the entire contents of which are incorporated by reference.

BACKGROUND

Field

The described technology relates to an actuator that causes a predetermined force to act on an object via an output piston portion.

Description of the Related Technology

There are cases where an electrical circuit is provided with an interruption device that interrupts continuity between pieces of equipment constituting the electrical circuit, by operating when abnormality occurs in the equipment or when abnormality occurs in a system in which the electrical circuit is incorporated. As one form of the interruption device, there is proposed a continuity interruption device that forcibly and physically cuts a conductive material interposed between pieces of equipment by moving a cutting member at high speed using high-pressure gas. For example, in a technique of Japanese Patent Application Publication No. 2014-49300, a conductive material forming part of an electrical circuit is cut by driving a cutting member using high-pressure gas generated by a gas generator, and an arc generated between cut end portions in the conductive material resulting from the cutting is extinguished. With this, more reliable continuity interruption is allowed.

In addition, an actuator for pressurization that uses combustion energy of gunpowder is also developed. For example, U.S. Pat. No. 6,397,595 discloses a technique related to an actuator for driving a control member via a membrane by using the combustion energy of the gunpowder to interrupt the flow of a medium in a channel. In the technique, the elastically deformable membrane sandwiched between the control member and a housing receives the combustion pressure of the gunpowder and is thereby deformed, a cylinder portion attached to the membrane is displaced, and the control member is thereby driven.

SUMMARY

In order to efficiently use the combustion energy of the gunpowder as a power source in an actuator that causes a predetermined force to act on an object, it is necessary to efficiently transmit the generated combustion energy to an output piston portion of the actuator. For the efficient transmission of the generated combustion energy, it is important to seal a combustion product generated by combustion of the gunpowder in a specific closed space and increase pressure inside the closed space.

On the other hand, as in the conventional art, in the case where a space in which the combustion of the gunpowder is performed is separated from a space in which an output portion (control member) of the actuator serving as a pressurization target is disposed by the elastically deformable membrane, and the combustion energy of the gunpowder is transmitted to the control member via the deformation of the membrane, the membrane is elastically deformed sharply at the time of the combustion. On the other hand, in order to displace the control member a required distance, the membrane needs to be elastically deformed significantly toward the control member by the combustion of the gunpowder, and it is feared that the membrane may be damaged or torn in some situations. When the membrane is damaged, it is not possible to seal the combustion product in the space on the side where the combustion is performed, and it becomes difficult to drive the control member. In addition, the elastically deformable membrane according to the conventional art is deformed so as to stick to a specific surface in an internal space. However, depending on the deformation of the membrane, the membrane cannot necessarily press the control member adequately, and adequate transmission of the combustion energy to the control member may be hindered.

To cope with this, in view of the above problem, an object of the described technology is to suitably transmit, in an actuator that is driven by gunpowder combustion, energy for driving an output piston portion of the actuator to the output piston portion.

In order to solve the above problem, the described technology has adopted a configuration in which a sealing member, which separates a space in a device body into the side of an ignition device and the side of an output piston portion, seals a combustion product generated by the ignition device in the space on the side of the ignition device. With this configuration, it is possible to suitably increase pressure in the space on the side of the ignition device. In addition, the sealing member is formed of a metal plate-like member, whereby the sealing member is suitably deformed by gunpowder combustion in the ignition device, and the shape of the sealing member after the deformation is easily maintained because the sealing member is made of metal. As a result, transmission of driving energy to the output piston portion becomes preferable.

Specifically, one embodiment of the described technology is an actuator that includes an actuator body having a through hole that is formed in an axial direction and an output piston portion disposed so as to be slidable in the through hole, the actuator causing a predetermined force to act on an object by causing the output piston portion to protrude from an output surface of the actuator body, and the actuator further including: an ignition device that combusts gunpowder, the ignition device applying, to the output piston portion, driving energy for causing the output piston portion to slide using gunpowder combustion in the ignition device; and a sealing member that is formed of a metal plate-like member, that separates a space in the actuator body into a first space in which the ignition device is disposed and a second space in which the output piston portion is disposed, and that seals a combustion product generated by the ignition device in the first space. A peripheral edge portion of the sealing member is fixed to an inner wall that defines the space in the actuator body, and the sealing member is deformed by the gunpowder combustion in the ignition device such that a central portion of the sealing member is displaced to a side of the output piston portion, to thereby press the output piston portion using the central portion and cause the output piston portion to slide in the through hole.

The actuator according to the described technology can effectively increase pressure in the first space at the time of the gunpowder combustion in the ignition device by separating the inside of the actuator body into the first space and the second space using the sealing member. The central portion of the sealing member is displaced to the side of the output piston portion by the driving energy generated by the gunpowder combustion in the ignition device, whereby the central portion presses the output piston portion, and the output piston portion slides in the through hole. In addition, an acting end portion of the output piston portion is protruded from the output surface by the slide of the output piston portion, and the predetermined force is thereby caused to act on the object. The predetermined force is appropriately set according to the purpose of action on the object. For example, in order to destroy the object, a force required for the destruction is set as the predetermined force. Note that, in the case where the displacement of the central portion of the sealing member is caused by the combustion of the gunpowder, it is possible to appropriately adopt configurations such as a configuration in which the driving energy is caused to directly act on the output piston portion via the central portion, and a configuration in which the driving energy is caused to propagate to another gas, liquid, or solid once and is then caused to indirectly act on the output piston portion via the central portion.

In the actuator according to the described technology, the ignition device that combusts the gunpowder may be the ignition device in which the gunpowder accommodated in the ignition device is ignited by execution of the ignition device and the combustion product of the gunpowder is generated, and may also be the ignition device in which a known gas generating agent (e.g., single-base smokeless gunpowder) is further combusted by the ignition of the gunpowder and the combustion products of the gunpowder and the gas generating agent are generated, and the specific configuration of the ignition device is not limited in the actuator of the described technology.

When the gunpowder is combusted in the above ignition device, the combustion product is diffused in the first space in the actuator body and its internal pressure is increased, whereby the driving energy is transmitted to the output piston portion and, as described above, the energy serves as a power source for driving the output piston portion. The actuator according to the described technology includes the sealing member, and hence the combustion product is sealed in the first space, and does not enter the second space. Consequently, the driving energy by the combustion product is not diffused uselessly, and the energy is expected to be transmitted to the output piston portion. On the other hand, in order to drive the output piston portion, the deformation of the sealing member for effective pressing is required. Accordingly, the sealing member needs to achieve both of suitable sealing of the combustion product and the deformation for suitable transmission of the driving energy to the output piston portion.

To cope with this, the sealing member provided in the actuator of the described technology is formed of the metal plate-like member. The sealing member is formed of the plate-like member, whereby, when the gunpowder is combusted in the ignition device, generated combustion energy can be received by the surface of the plate-like member. As a result, it is possible to make the displacement amount of the central portion of the sealing member as large as possible, and it becomes easier for the central portion of the sealing member to suitably press the side of the output piston portion. Further, the sealing member is made of metal, whereby, in the case where the sealing member receives the combustion energy of the gunpowder and is deformed, the state after the deformation is maintained more easily than in the case where the sealing member is made of, e.g., an elastic resin such as rubber. That is, when the metal sealing member receives the combustion energy of the gunpowder, the metal sealing member is plastically deformed and does not return to its original state easily, and it becomes possible to substantially maintain the deformed state. This is extremely useful in the actuator that transmits the combustion energy to the side of the output piston portion via the sealing member. This is because the returning of the sealing member to the original state after the deformation means that the combustion energy to be transmitted to the side of the output piston portion is lost. In view of the foregoing, in the actuator according to the described technology, it becomes possible for the sealing member to achieve both of the sealing of the combustion product and the deformation for the suitable transmission of the energy to the piston portion.

The actuator described above may be configured such that the sealing member is curved such that the central portion is positioned on a side of the ignition device with respect to the peripheral edge portion in a state before the gunpowder combustion in the ignition device, and the sealing member is curved such that the central portion is positioned on a side opposite to the side of the ignition device with respect to the peripheral edge portion by the gunpowder combustion in the ignition device. Thus, when the sealing member is deformed such that the position of the central portion of the sealing member with respect to the peripheral edge portion is displaced from the side of the ignition device, which is the side before the gunpowder combustion in the ignition device, to the side opposite to the side of the ignition device after the gunpowder combustion in the ignition device, it is possible to secure the large displacement amount of the sealing member in the direction of the slide of the output piston portion at the time of the combustion. As a result, it becomes possible to efficiently transmit the energy to the output piston portion via the sealing member.

In addition, in the actuator described above, with approach to the central portion of the sealing member from the ignition device along a central axis of the actuator body, a cross-sectional area of the space in the actuator body in a direction perpendicular to the central axis may be reduced. According to this configuration, it is possible to apply the combustion energy of the gunpowder in the ignition device intensively to the sealing member. As a result, it is possible to secure the large displacement amount of the central portion of the sealing member by the gunpowder combustion. In addition, in the case where the large displacement amount of the central portion is secured, as described above, the sealing member is made of metal, and hence the central portion is formed so as not to return to the original state easily, and the efficient transmission of the energy to the output piston portion is thereby implemented.

Further, in the actuator described above, the ignition device may have a release portion that releases the combustion product generated by the gunpowder combustion and, in this case, the central portion of the sealing member is disposed so as to face the release portion. According to this configuration, it is possible to effectively apply the combustion energy of the gunpowder to the central portion of the sealing member, which contributes to the efficient transmission of the energy to the output piston portion.

Furthermore, in the actuator described above, an end portion of the output piston portion may be in contact with the central portion of the sealing member in the state before the gunpowder combustion in the ignition device. According to this configuration, it is possible to efficiently transmit the energy from the sealing member that receives the combustion energy of the gunpowder and is deformed to the output piston portion.

According to some embodiments of the described technology, in the actuator that is driven by the gunpowder combustion, it becomes possible to suitably transmit the energy for driving the output piston portion of the actuator to the output piston portion.

DETAILED DESCRIPTION

Hereinbelow, actuators according to embodiments of the described technology will be described with reference to the drawings. Note that the configurations of the following embodiments are shown by way of example only, and the described technology is not limited to the configurations of the embodiments.

First Embodiment

Figure 1:
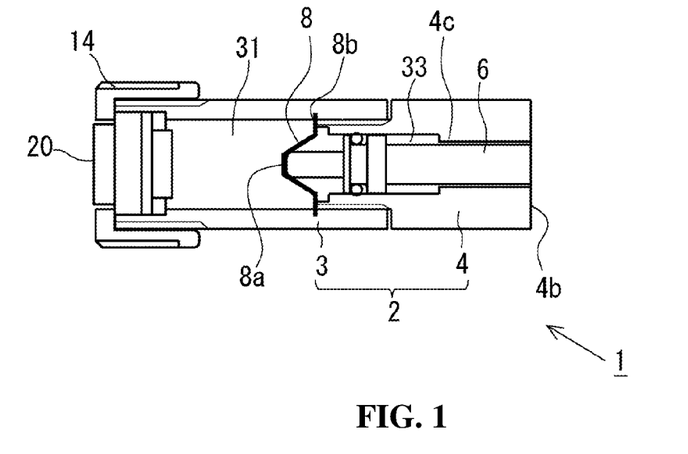
FIG. 1 is a view showing the schematic configuration of an actuator according to a first embodiment of the described technology.

FIG. 1 is a cross-sectional view of an actuator 1 in the case where the actuator 1 is cut in its axial direction. The actuator 1 has an actuator body 2 constituted by a first housing 3 and a second housing 4, and the side of the tip of the actuator body 2 (the side of an end portion of the second housing 4 opposite to an end portion thereof connected to the first housing 3) corresponds to the side of an output by the actuator 1, i.e., the side where an object on which a predetermined force acts is disposed. The first housing 3 and the second housing 4 are fixed to each other with a screw and are thereby integrated with each other. Inside the first housing 3, a combustion chamber 31 that is an internal space extending in an axial direction of the first housing 3 is formed and, inside the second housing 4, a through hole 33 that is an internal space extending similarly in an axial direction of the second housing 4 is formed. Although the combustion chamber 31 and the through hole 33 are separated from each other by a sealing member 8 described later, they are the internal spaces that are continuously disposed inside the actuator body 2.

A surface on the side of the tip of the actuator body 2, i.e., a surface on the side of the tip of the second housing 4 forms an output surface 4b. The output surface 4b serves as the surface that faces the object on which the predetermined force acts during the use of the actuator 1. A metal output piston 6 is disposed in the through hole 33 in the second housing 4 of the actuator body 2, and the output piston 6 is held so as to be slidable in the through hole 33.

Figure 2:
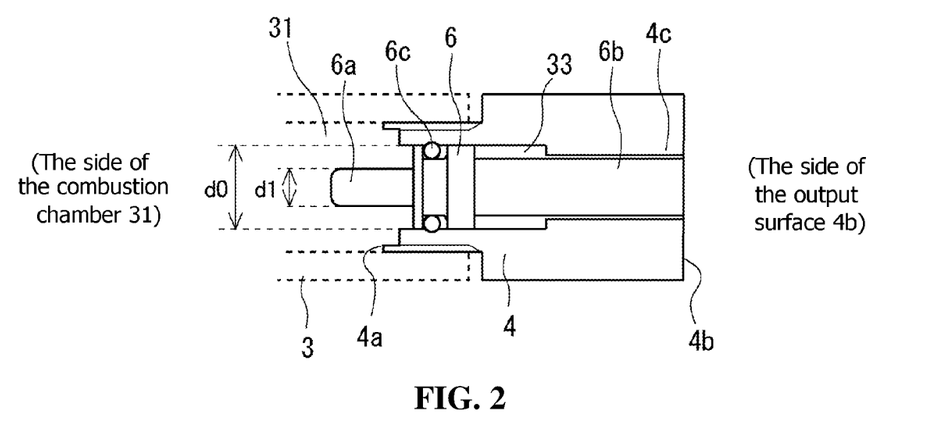
FIG. 2 is a view showing the details of a piston of the actuator shown in FIG. 1.

FIG. 2 shows the details of the output piston 6 such that the positional relationship between the output piston 6 and the second housing 4 can be grasped. The output piston 6 is formed into a substantially shaft-like shape that extends along an axial direction of the through hole 33, and has an end portion (hereinafter referred to as a "first end portion") 6a on the side of the combustion chamber 31 and an end portion on the side of the output surface 4b, i.e., an end portion (hereinafter referred to as a "second end portion") 6b that causes the predetermined force to act on the object, and an O-ring 6c is disposed around the output piston 6 such that the output piston 6 can slide smoothly in the through hole 33.

In a state in which the actuator body 2 is formed by mounting the first housing 3 (indicated by a dotted line in FIG. 2) and the second housing 4 to each other, and gunpowder combustion is not yet performed in an initiator 20 (hereinafter to be interchangeably used with "ignition device") serving as an ignition device described later (hereinafter referred to as a "pre-combustion state"), the first end portion 6a is substantially protruded to the side of the combustion chamber 31 from an end surface of a fitted portion 4a of the second housing 4 that is fitted in the combustion chamber 31 of the first housing 3. A diameter dl of the first end portion 6a is smaller than a diameter d0 of the through hole 33. Consequently, when the output piston 6 slides to the side of the output surface 4b in the through hole 33, a specific gap is formed between a side surface (a surface extending along an axial direction of the output piston 6) of the first end portion 6a and an inner wall surface of the through hole 33. In addition, in the pre-combustion state, an end surface of the second end portion 6b is flush with the output surface 4b, or is positioned inwardly of the output surface 4b in the through hole 33. Consequently, as will be shown in FIG. 5, in a state in which the actuator 1 is used, the actuator 1 is disposed and fixed such the output surface 4b is in contact with the object on which the predetermined force acts. In addition, a reduced diameter portion, the inner diameter of which is reduced in the vicinity of the output surface 4b in the through hole 33 is formed, and the reduced diameter portion functions as a stopper portion 4c that comes into contact with the output piston 6 when the output piston 6 slides in the through hole 33, and stops the slide.

Figure 4:
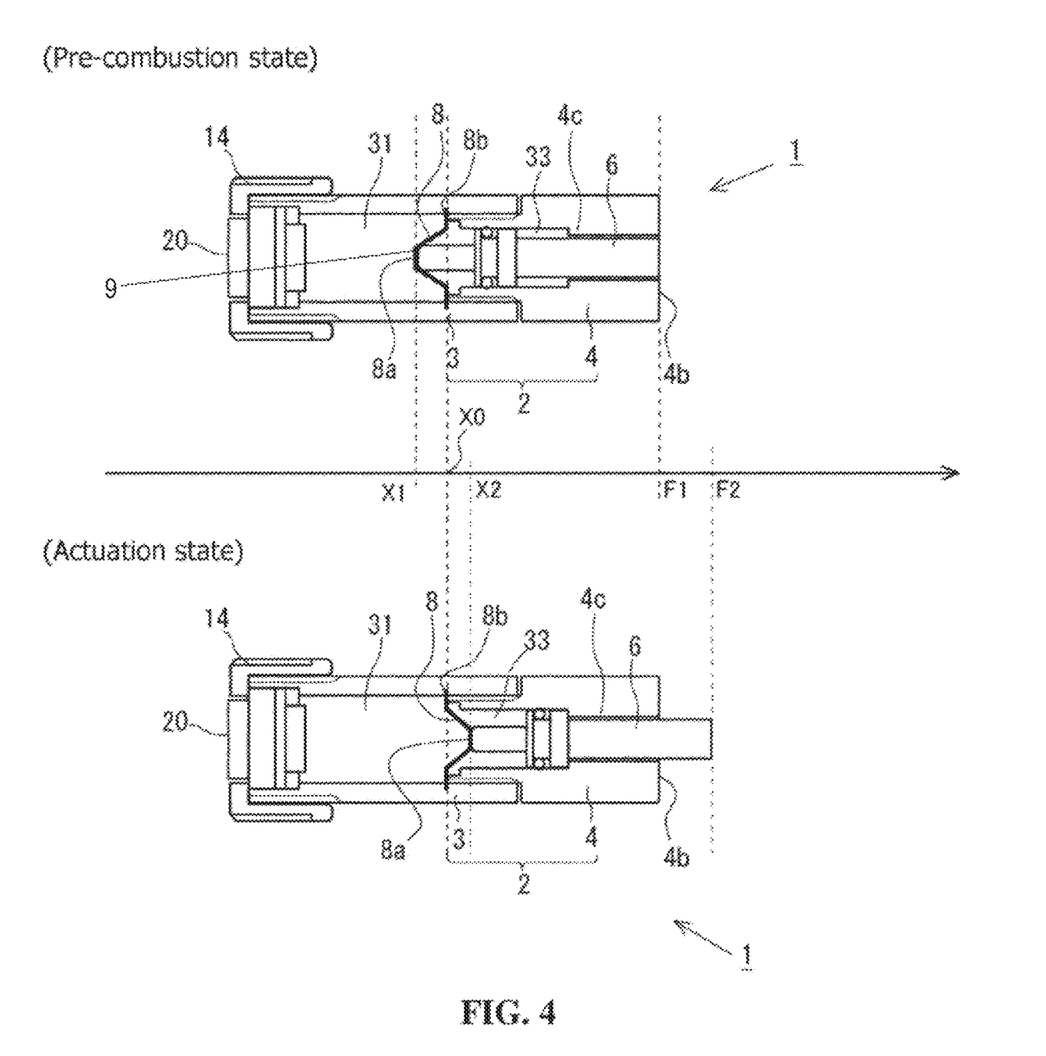
FIG. 4 is a view in which, in the actuator shown in FIG. 1, a state before gunpowder combustion in the initiator and a state after gunpowder combustion therein are compared with each other and shown.

In a pre-ignition state shown in FIG. 1, the sealing member 8 is fixed such that a peripheral edge portion 8b of the sealing member 8 is disposed on the end surface of the fitted portion 4a of the second housing 4 that is part of an inner wall of the actuator body 2, and the peripheral edge portion 8b is buried in the first housing 3 in the vicinity of the fitted portion 4a. In addition, in the pre-ignition state, a central portion 8a of the sealing member 8 is in contact with an end surface of the first end portion 6a of the output piston 6. As described above, in the pre-ignition state, the first end portion 6a is disposed so as to be protruded in the first housing 3, and hence, as a result, the sealing member 8 is fixed in the actuator body 2 in a state in which the sealing member 8 is curved to the side of the initiator 20 in the pre-ignition state. The central portion 8a includes a contacting portion 9 as shown in FIG. 4 (see the replacement sheet concurrently being submitted). The sealing member 8 is a plate-like member formed of a metal material, and separates the space in the actuator body 2 into a space including the combustion chamber 31 positioned on the side of the initiator 20 (corresponds to a first space according to the described technology) and a space including the through hole 33 positioned on the side of the output piston 6 (corresponds to a second space according to the described technology), and a combustion product generated by the gunpowder combustion in the initiator 20 is thereby sealed in the combustion chamber 31. Note that the movement of the sealing member 8 by the gunpowder combustion in the initiator 20 will be described later.

Figure 3:
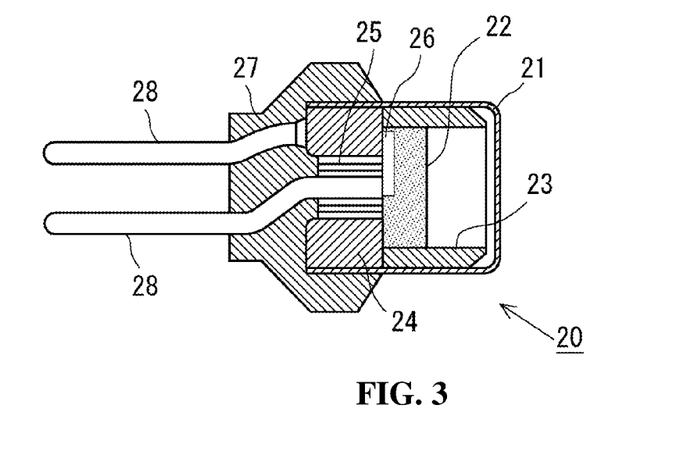
FIG. 3 is a view showing the schematic configuration of an initiator (ignition device) mounted to the actuator shown in FIG. 1.

An example of the initiator 20 will be described based on FIG. 3. The initiator 20 is an electrical ignition device, and a space for disposing gunpowder 22 is defined in a cup 21 by the cup 21, the surface of which is covered with an insulating cover. A metal header 24 is disposed in the space, and a tubular charge holder 23 is provided on an upper surface of the metal header 24. The gunpowder 22 is held by the charge holder 23. A bridge wire 26 that electrically connects one of conductive pins 28 and the metal header 24 is disposed at a bottom portion of the gunpowder 22. Note that the two conductive pins 28 are fixed to the metal header 24 via an insulator 25 so as to be insulated from each other when voltage is not applied. Further, an open port of the cup 21 from which the two conductive pins 28 supported by the insulator 25 extend is protected by a resin collar 27 in a state in which insulation characteristics between the conductive pins 28 are properly maintained.

In the thus configured initiator 20, when a voltage is applied between the two conductive pins 28 by an external power source, a current flows to the bridge wire 26, and the gunpowder 22 is thereby combusted. At this point, the combustion product generated by the combustion of the gunpowder 22 is jetted from an opening portion of the charge holder 23. The cross section of an initiator cap 14 is formed into a flange-like shape such that the initiator cap 14 is caught on an outer surface of the initiator 20, and the initiator cap 14 is fixed to the first housing 3 by using a screw. With this, the initiator 20 is fixed to the first housing 3 by using the initiator cap 14, and it is possible to prevent the initiator 20 itself from being disconnected from the actuator body 2 by pressure generated at the time of the ignition in the initiator 20.

An example of the gunpowder 22 used in the actuator 1 preferably includes a gunpowder containing zirconium and potassium perchlorate (ZPP), a gunpowder containing titanium hydride and potassium perchlorate (THPP), a gunpowder containing titanium and potassium perchlorate (TiPP), a gunpowder containing aluminum and potassium perchlorate (APP), a gunpowder containing aluminum and bismuth oxide (ABO), a gunpowder containing aluminum and molybdenum oxide (AMO), a gunpowder containing aluminum and copper oxide (ACO), a gunpowder containing aluminum and iron oxide (AFO), or a gunpowder obtained by combining a plurality of the gunpowders. Each gunpowder exhibits a characteristic that the gunpowder generates high-temperature high-pressure plasma during the combustion immediately after the ignition but, when the temperature is reduced to normal temperature and the combustion product condenses, generated pressure is sharply reduced because no gas component is contained. Note that another gunpowder other than the gunpowders described above may be used.

Nothing is disposed in the combustion chamber 31 shown in FIG. 1, but a gas generating agent that is combusted by the combustion product generated by the combustion of the powder 22 and generates gas may be disposed in the combustion chamber 31. In the case where the gas generating agent is disposed in the combustion chamber 31, an example of the gas generating agent includes single-base smokeless gunpowder containing 98 mass % of nitrocellulose, 0.8 mass % of diphenylamine, and 1.2 mass % of potassium sulfate. In addition, it is also possible to use various gas generating agents that are used in a gas generator for an air bag and a gas generator for a seat belt pretensioner. In the combined use of the gas generating agent and the gunpowder, unlike the case where only the gunpowder 22 is used, specific gas generated during the combustion contains the gas component even at normal temperature, and hence the reduction rate of the generated pressure is low. Further, combustion completion time at the time of the combustion of the gas generating agent is significantly longer than that of the above gunpowder 22, but it is possible to change the combustion completion time of the gas generating agent by adjusting the dimensions, the size, the shape, and particularly the surface shape of the gas generating agent when the gas generating agent is disposed in the combustion chamber 31. Thus, by adjusting the amount, the shape, and the disposition of the gas generating agent, it is possible to appropriately adjust the generated pressure in the combustion chamber 31.

The movement of each of the sealing member 8 and the output piston 6 in the actuator 1 when the gunpowder 22 in the initiator 20 is combusted will be described based on FIG. 4. The upper part of FIG. 4 shows the configuration of the actuator 1 in the pre-combustion state, while the lower part of FIG. 4 shows the configuration of the actuator 1 in a state in which the actuator 1 is actuated by the combustion of the gunpowder 22 (hereinafter referred to as an "actuation state"). In the comparison between the pre-combustion state and the actuation state in FIG. 4, the positions of the peripheral edge portions 8b of the sealing members 8 are aligned and the states are arranged side by side and shown in the axial direction of the actuator 1. In addition, the position of the peripheral edge portion 8b common to both of the states is indicated by the origin X0. Further, in the pre-combustion state, the position of the central portion 8a of the sealing member 8 is indicated by X1, and the position of the end surface of the second end portion 6b of the output piston 6 is indicated by F1.

In the pre-combustion state, the peripheral edge portion 8b is disposed on the end surface of the fitted portion 4a and the sealing member 8 is fixed on the side of the first housing 3 and, at this point, the sealing member 8 is curved such that the central portion 8a of the sealing member 8 is positioned on the side of the initiator 20 with respect to the peripheral edge portion 8b, and the central portion 8a of the sealing member 8 is in contact with the end surface of the first end portion 6a of the output piston 6. In addition, the central portion 8a of the sealing member 8 is positioned so as to face the cup 21 of the initiator 20. With this disposition, the sealing member 8 receives pressure by the combustion product released from the initiator 20 using its plate-like surface. In particular, the central portion 8a of the sealing member 8 is disposed at the position where the central portion 8a receives the pressure directly, and hence, as will be described later, it becomes easier for the central portion 8a to press the output piston 6.

When the gunpowder 22 is combusted in the initiator 20, the combustion product is diffused in the combustion chamber 31, and the pressure in the combustion chamber 31 is increased. With this, the pressure is also applied to the sealing member 8. At this point, the central portion 8a is positioned in the central part of the plate-like sealing member 8, and hence the central portion 8a is the portion that is most likely to be deformed in the sealing member 8 of which the peripheral edge portion 8b is fixed. Accordingly, when the pressure is applied to the sealing member 8 by the gunpowder combustion, the sealing member 8 is deformed such that the central portion 8a presses the first end portion 6a of the output piston 6 to the side of the tip of the actuator 1. In other words, the sealing member 8, which is curved such that the central portion 8a is positioned on the side of the initiator 20 with respect to the peripheral edge portion 8b, is deformed so as to be curved such that the central portion 8a is positioned on the side of the output surface 4b opposite to the side of the initiator 20 by the gunpowder combustion. In the actuation state shown in FIG. 4, the position of the central portion 8a of the sealing member 8 is indicated by X2, and the position of the end surface of the second end portion 6b of the output piston 6 is indicated by F2. Consequently, the displacement amount of the central portion by the gunpowder combustion is given by (X2−X1). By causing the central portion 8a to move in response to the movement of the sealing member 8, it is possible to secure the large displacement amount of the sealing member 8 by the gunpowder combustion, and efficiently press the output piston 6. Further, in the pre-combustion state, the central portion 8a is in contact with the first end portion 6a, and hence it is possible to effectively convert the displacement of the central portion 8a of the sealing member 8 by the gunpowder combustion to the slide of the output piston 6 and, as a result, it is possible to obtain the protrusion amount (F2−F1) of the output piston 6 by using the gunpowder combustion.

In addition, the sealing member 8 is formed of the metal material, and hence, when the pressure is applied sharply to the sealing member 8 by the gunpowder combustion in the initiator 20, the sealing member 8 is substantially plastically deformed when the central portion 8a is displaced from the position (X1) on the side of the initiator 20 to the position (X2) on the side of the output surface 4b with respect to the peripheral edge portion 8b, as described above (see the actuation state in FIG. 4). That is, when the sharp pressure change is caused by the gunpowder combustion, the pressure that exceeds the yield point of the metal material forming the sealing member 8 is applied to the sealing member 8, and the sealing member 8 is plastically deformed. This means that the central portion 8a of the sealing member 8, which has been displaced to the side of the output surface 4b with respect to the peripheral edge portion 8b, cannot easily return to the side of the initiator 20. Consequently, when the sealing member 8 presses the output piston 6 using the gunpowder combustion, the sealing member 8 can be deformed while adequately resisting reaction from the output piston 6, and hence it is possible to reliably cause the output piston 6 to operate.

In the thus configured actuator 1, the output piston 6 is pressed by the sealing member 8, the entire output piston 6 is thereby caused to slide, and the output piston 6 protrudes from the output surface 4b. In particular, the sealing member 8 is made of metal and is formed into the plate-like shape, and hence it becomes possible to effectively drive the output piston 6 using the central portion 8a. In addition, in the actuator 1, the sealing member 8 is disposed so as to separate the combustion chamber 31 and the through hole 33 that are the internal spaces of the actuator body 2 from each other, and seal the combustion product generated by the initiator 20 in the combustion chamber 31. With this configuration, it is possible to effectively transmit the pressure generated by the combustion product to the output piston 6.

Note that, in the above embodiment, the stopper portion 4c is designed such that F2−F1 is equal to X2−X1. Instead of this, the stopper portion 4c may be designed such that, after the pressing by the central portion 8a, the output piston 6 slides a predetermined distance in the through hole 33 and, as a result, F2−F1 is larger than X2−X1.

Application Example

Figure 5:
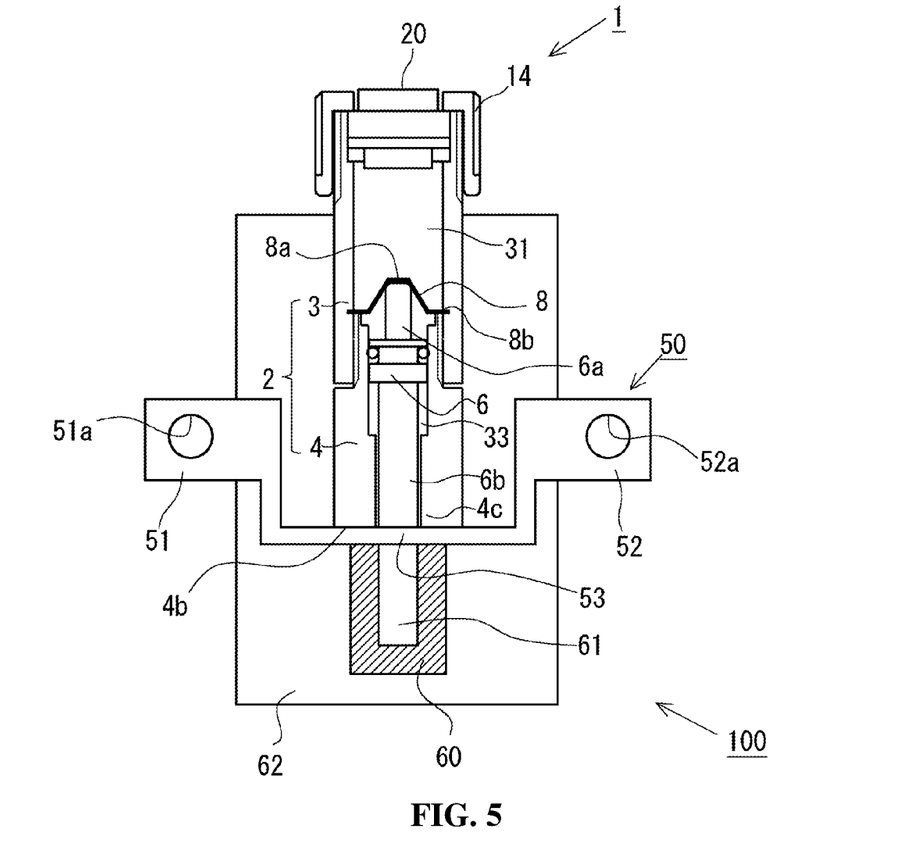
FIG. 5 is a view showing the schematic configuration of an electrical circuit interruption device to which the actuator according to the first embodiment of the described technology is applied.

FIG. 5 shows an electrical circuit interruption device 100 as an example of application of the actuator 1. The electrical circuit interruption device 100 is formed by fixing the actuator 1 to a conductor piece 50 via a housing 62.

The conductor piece 50 forms part of the electrical circuit when the electrical circuit interruption device 100 is mounted to the electrical circuit, and is a plate piece constituted by a first connection portion 51 and a second connection portion 52 on both end sides, and a cut portion 53 between the connection portions. The first connection portion 51 and the second connection portion 52 are provided with connection holes 51a and 52a for connection to other conductors (e.g., a lead wire) in the electrical circuit, respectively. Note that the conductor piece 50 shown in FIG. 5 is formed such that the first connection portion 51 and the second connection portion 52, and the cut portion 53 form a stepped shape, but the conductor piece 50 may also be formed such that the first connection portion 51, the second connection portion 52, and the cut portion 53 are disposed substantially on the same straight line. The cut portion 53 is fixed so as to be in contact with the output surface 4b of the actuator 1. Consequently, an end surface of the output piston 6 (the end surface of the second end portion 6b) in the actuator 1 faces the cut portion 53. The conductor piece 50 formed in this manner is the object in the above embodiment and, in particular, the cut portion 53 serves as a portion on the object on which the predetermined force from the actuator 1 acts.

Further, in the housing 62, on the side opposite to the actuator 1 beyond the cut portion 53, a box-shaped insulating portion 60 made of synthetic resin is formed, and an insulating space 61 is formed inside the insulating portion 60.

In the thus configured electrical circuit interruption device 100, when the initiator 20 is actuated by some trigger signal or manually, as described above, the output piston 6 slides, a shearing force is caused to act on the cut portion 53 by kinetic energy of the output piston 6, and the cut portion 53 is thereby cut. With this, in the conductor piece 50 forming part of the electrical circuit to which the electrical circuit interruption device 100 is mounted, continuity between the first connection portion 51 and the second connection portion 52 is interrupted. Note that a cut piece of the cut portion 53 that is cut by the output piston 6 is accommodated in the insulating space 61 in the insulating portion 60, and hence the above continuity interruption can be made more reliable.

In view of the foregoing, in the electrical circuit interruption device 100 to which the actuator 1 according to the described technology is applied, it is possible to efficiently drive the actuator 1, which is extremely useful in the electrical circuit interruption device 100 that is to implement reliable continuity interruption when necessary. Another example of the application of the actuator 1 can include a punch or the like that punches a hole in the object.

Second Embodiment

Figure 6:
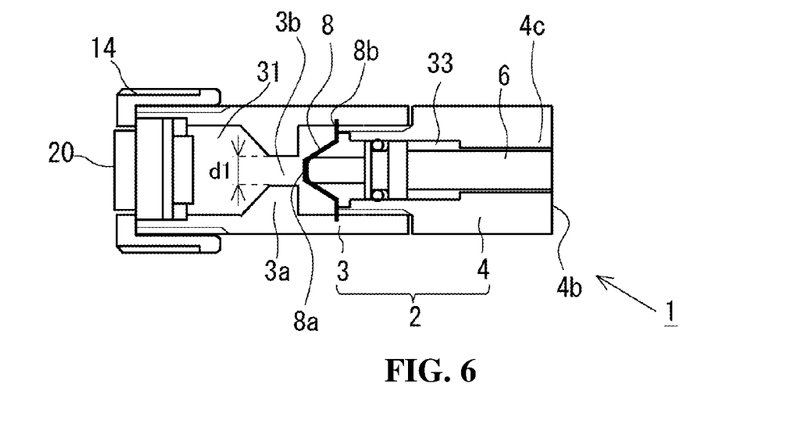
FIG. 6 is a view showing the schematic configuration of the actuator according to a second embodiment of the described technology.

FIG. 6 shows a second embodiment of the described technology. FIG. 6 shows the schematic configuration of the actuator 1 according to the present embodiment in the pre-combustion state. Note that, in the present embodiment, configurations substantially identical to those in the first embodiment described above are designated by the same reference numerals, and the detailed description thereof will be omitted.

In the actuator 1 of the present embodiment, a narrowed portion 3a is formed inside the first housing 3 such that the inner diameter of the combustion chamber 31 formed inside the first housing 3 is reduced with approach to the central portion 8a of the sealing member 8 from the side of the initiator 20 along the central axis of the actuator 1. With the narrowed portion 3a, the inner diameter of the combustion chamber 31 at a position where the inner diameter is smallest becomes substantially equal to dl that is the outer diameter of the first end portion 6a of the output piston 6, and a passage 3b having a diameter of about dl is formed in the combustion chamber 31 at a position facing the first end portion 6a. In the case where the combustion chamber 31 is formed in this manner, when the gunpowder is combusted in the initiator 20, it becomes easier for the pressure by the combustion product to act intensively on the central portion 8a of the sealing member 8. As a result, it becomes possible to efficiently bring the sealing member 8 in the pre-combustion state into the actuation state shown in FIG. 4, and the amount of gunpowder used in the initiator 20 can be thereby reduced.

Note that, in order to allow the combustion product concentrated as described above to act on the central portion 8a of the sealing member 8 that is in contact with the first end portion 6a of the output piston 6, it is preferable that a clearance between an end portion of the passage 3b on the side of the output piston 6 and the central portion 8a of the sealing member 8 with which the first end portion 6a is in contact be as small as possible. Also, by forming the narrowed portion 3a such that the inner diameter of the passage 3b is smaller than dl, it becomes possible to cause the combustion product to act on the central portion 8a of the sealing member 8 more intensively.

What is claimed is:

1. An actuator comprising:
   an actuator body having a through hole formed in an axial direction, the actuator body comprising an output piston portion disposed so as to be slidable in the through hole, the actuator configured to cause a predetermined force to act on an object by causing the output piston portion to protrude from an output surface of the actuator body;
   an ignition device configured to combust gunpowder, the ignition device configured to apply, to the output piston portion, driving energy for causing the output piston portion to slide using gunpowder combustion in the ignition device; and
   a sealing member formed of a metal plate-like member, the sealing member configured to separate a space in the actuator body into a first space in which the ignition device is disposed and a second space in which the output piston portion is disposed, and to seal a combustion product generated by the ignition device in the first space,
   wherein a peripheral edge portion of the sealing member is fixed to an inner wall that defines the space in the actuator body, wherein a central portion of the sealing member is configured to be deformed by the gunpowder combustion in the ignition device such that the central portion of the sealing member is displaced to a side of the output piston portion, so as to press the output piston portion using the central portion and cause the output piston portion to slide in the through hole,
   wherein the central portion comprises a contacting portion configured to directly contact and sized to overlap the output piston portion in the axial direction, and wherein the contacting portion is disposed closer to the ignition device than the peripheral edge portion in a state before the gunpowder combustion.

2. The actuator according to claim 1, wherein with approach to the central portion of the sealing member from the ignition device along a central axis of the actuator body, a cross-sectional area of the space in the actuator body in a direction perpendicular to the central axis is reduced.

3. The actuator according to claim 1, wherein the ignition device has a cup configured to release the combustion product generated by the gunpowder combustion, and wherein the central portion of the sealing member is disposed so as to face the cup.

4. The actuator according to claim 1, wherein an end surface of the output piston portion contacts the contacting portion of the central portion of the sealing member in the state before the gunpowder combustion in the ignition device.

5. The actuator according to claim 1, wherein the central portion of the sealing member is curved in opposite directions in the state before the gunpowder combustion and in a state after the gunpowder combustion.

6. The actuator according to claim 5, wherein the central portion of the sealing member is curved toward the ignition device in the state before the gunpowder combustion and curved toward the output piston portion in the state after the gunpowder combustion.

7. The actuator according to claim 1, wherein the sealing member is configured to be deformed in such a way as to be turned inside out in a state after the gunpowder combustion.

8. The actuator according to claim 7, wherein the central portion of the sealing member maintains a convex shape facing the output piston portion when the sealing member is turned inside out.

9. The actuator according to claim 1, wherein the output piston portion comprises an end surface facing the ignition device and a side surface facing the inner wall of the actuator body, and wherein the central portion of the sealing member is configured to cover both the end surface and at least a portion of the side surface of the output piston portion in the state before the gunpowder combustion.

10. The actuator according to claim 1, wherein the peripheral edge portion of the sealing member extends in a first direction substantially perpendicular to the axial direction.

11. The actuator according to claim 10, wherein the peripheral edge portion of the sealing member and the output piston portion are configured to overlap each other in the first direction in the state before the gunpowder combustion.

12. The actuator according to claim 1, wherein the peripheral edge portion of the sealing member is substantially parallel to the contacting portion of the central portion of the sealing member.

* * * * *